(12) United States Patent
Yamazaki et al.

(10) Patent No.: US 12,379,122 B2
(45) Date of Patent: Aug. 5, 2025

(54) LINKING SYSTEM AND LINKING CONTROL METHOD

(71) Applicant: SHIMIZU CORPORATION, Tokyo (JP)

(72) Inventors: Motoaki Yamazaki, Tokyo (JP); Michihito Shiraishi, Tokyo (JP)

(73) Assignee: SHIMIZU CORPORATION, Tokyo (JP)

( * ) Notice: Subject to any disclaimer, the term of this patent is extended or adjusted under 35 U.S.C. 154(b) by 392 days.

(21) Appl. No.: 17/950,146

(22) Filed: Sep. 22, 2022

(65) Prior Publication Data
US 2023/0015053 A1   Jan. 19, 2023

Related U.S. Application Data

(63) Continuation of application No. PCT/JP2021/011683, filed on Mar. 22, 2021.

(30) Foreign Application Priority Data

Mar. 24, 2020 (JP) .................................. 2020-052533
Sep. 16, 2020 (JP) .................................. 2020-155839

(51) Int. Cl.
F24F 11/58   (2018.01)

(52) U.S. Cl.
CPC .................................. *F24F 11/58* (2018.01)

(58) Field of Classification Search
CPC .................................................... F24F 11/58
See application file for complete search history.

(56) References Cited

U.S. PATENT DOCUMENTS

2010/0274366 A1* 10/2010 Fata ..................... H04L 12/2818
                                                                    700/8
2013/0289778 A1   10/2013 Ishizaka
(Continued)

FOREIGN PATENT DOCUMENTS

CN       106878416 A      6/2017
JP       2005-172346 A    6/2005
(Continued)

OTHER PUBLICATIONS

Japanese Office Action mailed on May 21, 2024 in a counterpart Japanese patent application No. 2020-175930.
(Continued)

*Primary Examiner* — Mohammad Ali
*Assistant Examiner* — Vincent W Chang
(74) *Attorney, Agent, or Firm* — METROLEX IP LAW GROUP, PLLC; Robert L. Scott, Esq.

(57) ABSTRACT

A linking system includes a first linking control device which performs control such that a first building management system that manages building facilities provided in a first building and a first device connected to an internet to linked to realize a specific function, wherein the first linking control device includes a memory which memories linking procedure information indicating procedures for realizing the linking of the specific function; and a linking controller which controls (i) an output to the first device in response to an input from the first building management system or (ii) an output to the first building management system in response to an input from the first device so as to realize the specific function based on the linking procedure information stored in the memory.

4 Claims, 12 Drawing Sheets

(56) References Cited

U.S. PATENT DOCUMENTS

| | | | |
|---|---|---|---|
| 2014/0115025 A1* | 4/2014 | Taoka | H04L 67/10 709/201 |
| 2015/0088312 A1 | 3/2015 | Lo et al. | |
| 2017/0094035 A1* | 3/2017 | Nakamura | H04L 67/142 |
| 2018/0202675 A1* | 7/2018 | Park | F24F 11/62 |
| 2018/0270075 A1* | 9/2018 | Cosserat | H04L 12/2807 |
| 2018/0364665 A1* | 12/2018 | Clymer | G05B 19/042 |
| 2019/0107832 A1 | 4/2019 | Strand et al. | |
| 2020/0004213 A1* | 1/2020 | Ratti | G05B 15/02 |
| 2020/0374697 A1* | 11/2020 | Higley | G05B 19/042 |

FOREIGN PATENT DOCUMENTS

| | | |
|---|---|---|
| JP | 2010-141826 A | 6/2010 |
| JP | 2014-10770 A | 1/2014 |
| JP | 2014-206794 A | 10/2014 |
| JP | 2015-039082 A | 2/2015 |
| JP | 2016-224578 A | 12/2016 |
| JP | 2018-019313 A | 2/2018 |
| JP | 2019-009535 A | 1/2019 |
| JP | 2019-125068 A | 7/2019 |
| WO | 2012/101762 A1 | 8/2012 |
| WO | 2018/173127 A1 | 9/2018 |
| WO | 2019/202697 A1 | 10/2019 |

OTHER PUBLICATIONS

Hitachi Information & Telecommunication Engineering Ltd., Service and data security using IoT, Monthly automatic recognition, Jun. 10, 2018, pp. 46-54, vol. 31, No. 7; Concise explanation of relevance is indicated in ISR.

The International Search Report ("ISR") of PCT/JP2021/011683 mailed on Jun. 1, 2021.

Japanese Office Action mailed on Oct. 15, 2024 in counterpart Japanese patent application No. 2020-175613.

Kishimoto et al., "Construction of Net Zero-Energy Building and Smart Wellness Office Based on Digital Transformation in Buildings and Facilities Field", Toshiba Review vol. 75, No. 1 [online], p. 38-42, Japan, Jan. 24, 2020; Cited in the JPOA mailed on Jun. 11, 2024 in a counterpart Japanese patent application No. 2020-175613.

Japanese Office Action mailed on Jun. 11, 2024 in counterpart Japanese patent application No. 2020-175613.

The Office Action (JPOA) issued on Feb. 25, 2025 in a counterpart Japanese patent application No. 2020-175613, with English translation.

The Office Action (SGOA) issued on Mar. 17, 2025 in a counterpart Singaporean patent application No. 11202253327X.

* cited by examiner

FIG. 4A

| CORRESPONDING COMMAND INFORMATION | PROCEDURE INSTRUCTION INFORMATION (IF-THEN INFORMATION) | | | ADJUSTMENT CONTROL INFORMATION |
|---|---|---|---|---|
| | INSTRUCTING SUBJECT | CONDITIONAL OPERATION | EXECUTION SUBJECT | EXECUTION CONTENT | |
| ID0001 (COORDINATION COMMAND A) | USER TERMINAL | INSTRUCTION FOR INCREASING ILLUMINATION IN THIRD AREA ON SECOND FLOOR OF BUILDING | ILLUMINATION DEVICE IN THIRD AREA ON SECOND FLOOR OF BUILDING | INCREASE ILLUMINATION | SET T-SECOND NON-RECEPTION PERIOD WITH RESPECT TO COORDINATION COMMAND OF ID0002 |

FIG. 4B

| CORRESPONDING COMMAND INFORMATION | PROCEDURE INSTRUCTION INFORMATION (IF-THEN INFORMATION) | | | | ADJUSTMENT CONTROL INFORMATION |
|---|---|---|---|---|---|
| | INSTRUCTING SUBJECT | CONDITIONAL OPERATION | EXECUTION SUBJECT | EXECUTION CONTENT | |
| ID0002 (COORDINATION COMMAND B) | USER TERMINAL | INSTRUCTION FOR DECREASING ILLUMINATION IN THIRD AREA ON SECOND FLOOR OF BUILDING | ILLUMINATION DEVICE IN THIRD AREA ON SECOND FLOOR OF BUILDING | DECREASE ILLUMINATION | SET T-SECOND NON-RECEPTION PERIOD WITH RESPECT TO COORDINATION COMMAND OF ID0001 |

FIG. 5A

| CORRESPONDING COMMAND INFORMATION | PROCEDURE INSTRUCTION INFORMATION (IF-THEN INFORMATION) | | | | PRIORITY SET INFORMATION | PRIORITY CONTROL INFORMATION |
|---|---|---|---|---|---|---|
| | INSTRUCTING SUBJECT | CONDITIONAL OPERATION | EXECUTION SUBJECT | EXECUTION CONTENT | | |
| ID0011 (COORDINATION COMMAND C) | USER TERMINAL | BUTTON OPERATION INSTRUCTION OF ELEVATOR NO. 1 (UPWARD) | CONVEYANCE ROBOT | BUTTON OPERATION OF ELEVATOR NO. 1 (UPWARD) | LOW PRIORITY WITH RESPECT TO ID0012 | ... |

FIG. 5B

| CORRESPONDING COMMAND INFORMATION | PROCEDURE INSTRUCTION INFORMATION (IF-THEN INFORMATION) | | | | PRIORITY SET INFORMATION | PRIORITY CONTROL INFORMATION |
|---|---|---|---|---|---|---|
| | INSTRUCTING SUBJECT | CONDITIONAL OPERATION | EXECUTION SUBJECT | EXECUTION CONTENT | | |
| ID0012 (COORDINATION COMMAND D) | ROBOT CONTROL SYSTEM | BUTTON OPERATION INSTRUCTION OF ELEVATOR NO.1 (DOWNWARD) | CONVEYANCE ROBOT | BUTTON OPERATION OF ELEVATOR NO.1 (DOWNWARD) | LOW PRIORITY WITH RESPECT TO ID0011 | CANCEL COMMAND "ID0011" IN BUFFER |

FIG. 6A

| CORRESPONDING COMMAND INFORMATION | PROCEDURE INSTRUCTION INFORMATION (IF-THEN INFORMATION) | | | | RELATED SUBCOMMAND ID |
|---|---|---|---|---|---|
| | INSTRUCTING SUBJECT | CONDITIONAL OPERATION | EXECUTION SUBJECT | EXECUTION CONTENT | |
| ID0021 | HUMAN DETECTION SYSTEM | DETECT HUMAN IN THIRD AREA ON SECOND FLOOR OF BUILDING | AI SPEAKER WITH DEVICE ID=XXX | NOTIFY INTRUSION OF SUSPICIOUS PERSON BY VOICE | ID0022, ID0023 |

FIG. 6B

| CORRESPONDING COMMAND INFORMATION | PROCEDURE INSTRUCTION INFORMATION (IF-THEN INFORMATION) | | | |
|---|---|---|---|---|
| | INSTRUCTING SUBJECT | CONDITIONAL OPERATION | EXECUTION SUBJECT | EXECUTION CONTENT |
| ID0022 | HUMAN DETECTION SYSTEM | DETECT HUMAN IN THIRD AREA ON SECOND FLOOR OF BUILDING | ENTRANCE/EXIT DEVICE IN THIRD AREA ON SECOND FLOOR OF BUILDING | NOTIFY INTRUSION OF SUSPICIOUS PERSON |

FIG. 6C

| CORRESPONDING COMMAND INFORMATION | PROCEDURE INSTRUCTION INFORMATION (IF-THEN INFORMATION) | | | |
|---|---|---|---|---|
| | INSTRUCTING SUBJECT | CONDITIONAL OPERATION | EXECUTION SUBJECT | EXECUTION CONTENT |
| ID0023 | ENTRANCE/EXIT DEVICE IN THIRD AREA ON SECOND FLOOR OF BUILDING | NOTIFY INTRUSION OF SUSPICIOUS PERSON | AI SPEAKER WITH DEVICE ID=XXX | NOTIFY INTRUSION OF SUSPICIOUS PERSON BY VOICE |

| AREA DESIGNATION INFORMATION | COORDINATION COMMAND |
|---|---|

LINKING SYSTEM AND LINKING CONTROL METHOD

This application is a continuation application of PCT International Application No. PCT/JP2021/011683, filed Mar. 22, 2021, whose priority is claimed on Japanese Patent Application No. 2020-052533, filed Mar. 24, 2020, and Japanese Patent Application No. 2020-155839, filed Sep. 16, 2020. The contents of the PCT International Application and both Japanese Patent Applications are incorporated herein by reference.

TECHNICAL FIELD

The present disclosure relates to a linking system and a linking control method.

BACKGROUND

A data linking assistance system configured to be able to receive and transfer data between Saas (Software as a Service) is known.

SUMMARY

An aspect of the present disclosure is a linking system including a first linking control device which performs control such that a first building management system that manages building facilities provided in a first building and a first device connected to an internet to linked to realize a specific function, wherein the first linking control device includes a memory which memories linking procedure information indicating procedures for realizing the linking of the specific function; and a linking controller which controls (i) an output to the first device in response to an input from the first building management system or (ii) an output to the first building management system in response to an input from the first device so as to realize the specific function based on the linking procedure information stored in the memory.

BRIEF DESCRIPTION OF DRAWINGS

FIG. 4A is a view showing an example of linking procedure information according to the present embodiment.

FIG. 4B is a view showing an example of linking procedure information according to the present embodiment.

FIG. 5A is a view showing an example of linking procedure information according to the present embodiment.

FIG. 5B is a view showing an example of linking procedure information according to the present embodiment.

FIG. 6A is a view showing an example of linking procedure information according to the present embodiment.

FIG. 6B is a view showing an example of linking procedure information according to the present embodiment.

FIG. 6C is a view showing an example of linking procedure information according to the present embodiment.

DESCRIPTION OF EMBODIMENTS

Figure 1:
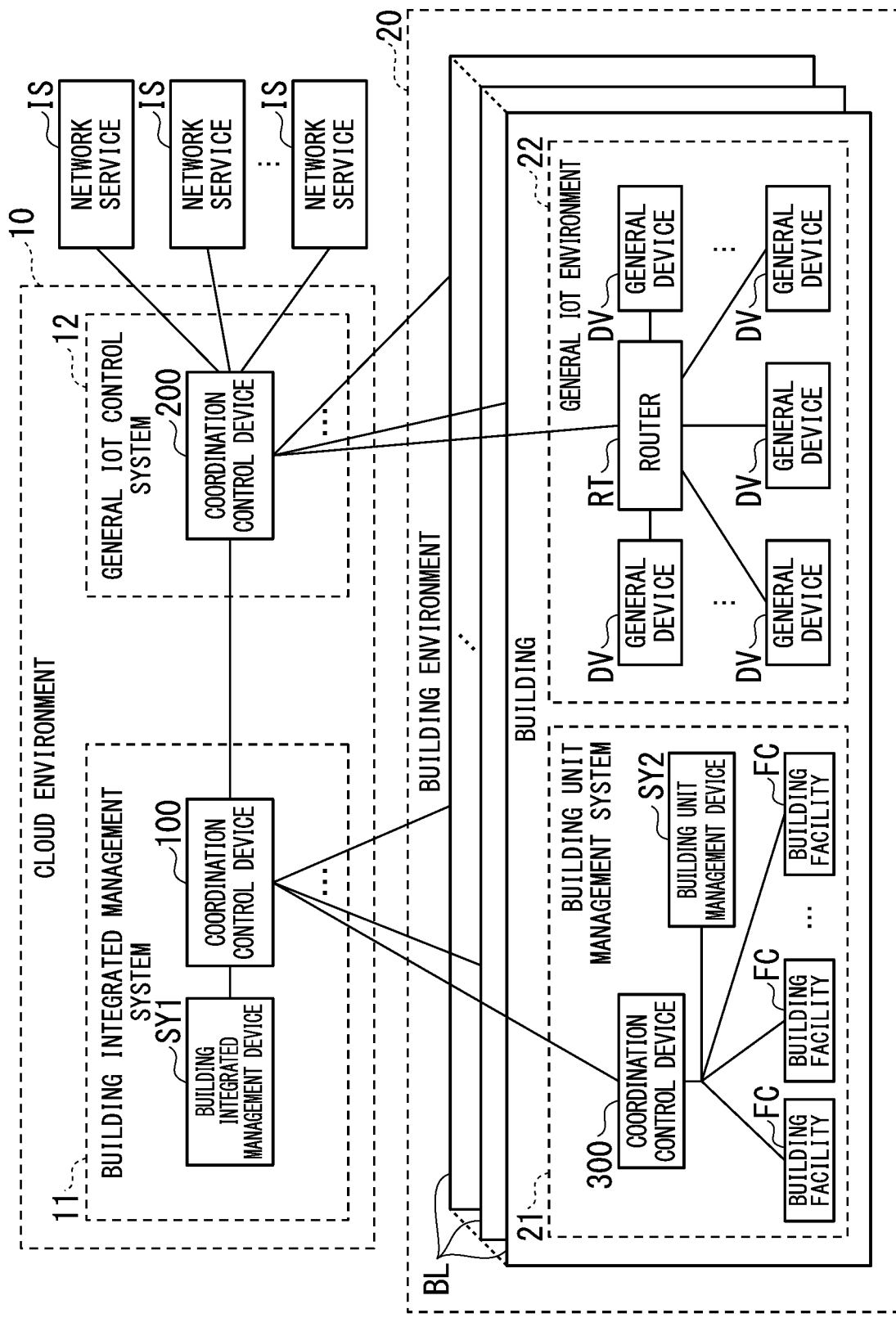
FIG. 1 is a view showing an example of a linking system according to the present embodiment.

FIG. 1 shows an example of a linking system according to the present embodiment. The linking system according to the present embodiment includes a cloud environment 10 and a building environment 20.

The cloud environment 10 is an environment constructed so as to manage a building and control IoT corresponding compatible devices used in the building by the cloud computing. The cloud environment 10 includes a building integrated management system 11 and a general IoT control system 12.

The building integrated management system 11 is an environment constructed so as to perform an integrated management of a building BL as a management target by the building manager. The building integrated management system 11 includes a building integrated management device SY1 and a linking control device 100. The building BL that is integratedly managed by the building integrated management system 11 may be one building or a plurality of buildings.

The building integrated management device SY1 includes, for example, a server, a database, and the like for the building integrated management. For example, the building integrated management device SY1 may be a configuration in which a plurality of physically independent devices are combined in a complex manner. In this case, the building integrated management device SY1 integrates and manages the plurality of buildings BL via the linking control device 100.

The function as the building integrated management device SY1 is realized by the building integrated management device SY1 executing an application program that provides a function corresponding to the building integrated management. In this aspect, the building integrated management device SY1 can be regarded as an application having a function corresponding to the building integrated management. The building integrated management device SY1 can be regarded as a device (facility compatible device) in which the application having the function corresponding to the building integrated management is implemented.

The linking control device 100 executes control such that an application linking is performed by the building integrated management system 11, the building unit management system 21 of each building BL, and the general IoT environment 22 of each building BL. With regard to the application linking, a process for providing a predetermined function is executed by linking an application among a plurality of predetermined devices.

As an example of the function of the linking control provided by the linking control device 100, for example, the inter-device linking among the building integrated management system 11, the building unit management system 21 of a specific building BL, and the general IoT environment 22 of the same building BL may be implemented. Also, for example, the device information of the building unit management system 21 in a plurality of different buildings BL may be transversely compared to implement the inter-device linking in corresponding to the conditions.

In the linking system shown in FIG. 1, although not shown in the figure, the building integrated management device SY1 and the linking control device 100 may be connected with a predetermined network service IS. For example, it is possible for the building integrated management device SY1 to determine an air conditioner operation plan for each building BL based on the weather forecast information of the corresponding area of the building BL acquired from the network service IS that provides information on the weather. The network service IS may be an SNS (Social Networking Service) provided on the cloud, or may be a cloud service for a data provision or a data linking.

The general IoT control system 12 is configured to control in the general IoT environments 22 of each building BL so as to realize various IoT functions used by the general users.

In such a control, the general users include a person works in a company, a commercial facility, or the like in the building BL. The General users include those who visit the companies and the like in the building BL as visitors, and customers who visit the commercial facilities and the like in the building BL.

The general IoT control system 12 includes a linking control device 200. The linking control device 200 is connected to general devices DV in the general IoT environment 22 for each building BL via a router RT. The linking control device 200 is connected to various network services IS. The network service IS may be, for example, an SNS, an e-mail service, a memo pad application service, or the like. Such a general device DV can be regarded as one of the devices corresponding to the application linking according to the present embodiment.

The network service IS is realized by implementing an application program on a device such as a server or the like configured to provide the network service IS. In this respect, According to the present embodiment, the network service IS is regarded as one of the devices corresponding to the application linking according to the present embodiment.

The linking control device 200 has a function of managing the connection between the general devices DV, the network service IS and the like corresponding to the general IoT environment 22 for each building BL.

The linking control device 200 can execute a predetermined application linking including an application corresponding to the general devices DV, the network service IS and the like connected to the linking control device 200.

In the linking system shown in FIG. 1, an aspect of the general device DV being connected to the network service IS from the router RT via the linking control device 200 is shown. However, in the linking system, the general device DV and the network service IS may be connected to each other without being through the router RT and the linking control device 200.

The building environment 20 is an environment formed by including a plurality of buildings BL that are managed by the cloud environment 10. One building BL in the building environment 20 includes the building unit management system 21 and the general IoT environment 22.

The building unit management system 21 performs the management in the unit of the building BL. The building unit management system 21 includes a building unit management device SY2, a building facility FC, and a linking control device 300. The linking control device 300 is an example of an assistance linking control device.

The functions of the building unit management device SY2 and the building facility FC are realized by the building unit management device SY2 and the building facility FC executing the application programs corresponding to the respective functions respectively. In this aspect, the building unit management device SY2 and the building facility FC may be referred to as applications implemented in the building unit management system 21, respectively. The building unit management device SY2 and the building facility FC may be referred to as devices (facility compatible devices) in which the applications are implemented.

The building unit management device SY2 and the building facility FC are general terms for an integrated system including a plurality of devices having predetermined functions and a server function for managing and controlling these devices.

The building unit management device SY2 includes, for example, a server, a database, and the like for managing the corresponding building BL. The building unit management device SY2 may be, for example, a configuration in which a plurality of physically independent devices are combined in a complex manner.

The building unit management device SY2 is connected to various building facility FC. The building facility FC includes, for example, an air conditioner, a lighting device, various sensors, a terminal device used by the building manager, a guidance robot, and the like in the building BL. The building unit management device SY2 is able to manage the building BL based on the sensor output that is output from the building facility FC as a sensor, for example, as a management basically concluded in the building BL. As an example, the building unit management device SY2 may perform a dimming control of the lighting device, an air conditioning control by an air conditioner, or the like in the building BL based on an output of a sensor provided to detect the presence or absence of a person in the building BL. In this case, the sensor, the lighting device, the air conditioner or the like are building facility FC provided in the building BL.

Although not shown in the figure, the building unit management device SY2 may be connected to a predetermined network service IS. The building unit management device SY2 may control a predetermined building facility FC based on the information acquired from the network service IS.

The building integrated management device SY1 provides appropriate instructions to the building unit management device SY2 of each building BL when integratedly controlling a plurality of buildings BL. The building unit management device SY2 may control, for example, a predetermined building facility FC in response to the instructions from the building integrated management device SY1. As a result, the integrated management of the plurality of buildings BL is realized.

The linking control device 300 of the building unit management system 21 is connected to the linking control device 100 of the building integrated management system 11.

The linking control device 300 may execute a predetermined application linking among the devices (for example, the building unit management device SY2, the building facility FC, and the like) provided in the building unit management system 21 of the same building BL, the devices provided in the building unit management system 21 and the general IoT control system 12 of another building BL, the network service IS, and the like.

The linking control device 300 can execute a predetermined application linking between devices (for example, the building unit management device SY2, the building facility FC, and the like) provided in the building unit management system 21 of the same building BL.

In other words, the linking control device 300 may execute the application linking concluded by the building unit management system 21. For example, the linking control device 300 can control a plurality of building facility FC in the same building BL to link to execute the predetermined operation. For example, the linking control device 300 may control a plurality of building facility FC in different buildings BL to link to execute the predetermined operation.

There is a case in which the communication between the linking control device 300 of the building unit management system 21 and the linking control device 100 of the building integrated management system 11 is impossible due to a communication failure or the like. In this case, the application linking between the building unit management system 21 and the building integrated management system 11, the application linking between the building unit management system 21 and the general IoT environment 22 and the like do not function. However, even in such a case, by providing the linking control device 300, it is possible to auxiliary make the application linking concluded in the building unit management system 21 to function in the entire linking system. As a result, the comfort and convenience of the building BL is not significantly impaired.

The general IoT environment 22 is an environment in which a general IoT function is realized in the building BL. The general IoT environment 22 includes a plurality of general devices DV. The general device DV is a general term including various IoT devices in the building BL that are used by general users and the server function for managing and controlling the IoT devices. The general device DV includes, for example, a personal computer, a smartphone, a tablet terminal, or the like individually used by the general user in the building BL. Common home appliances used in the building BL are included. The general devices DV may include an AI speaker, a digital-signage compatible display device used in the building BL, a navigation device for a vehicle entering and exiting the building BL, and the like. The general devices DV may include a device that performs IoT sensing such as a temperature sensor, a human sensor, a vibration sensor and the like.

The general device DV is wirelessly or wiredly connected to another general device DV in the same general IoT environment 22 via the router RT so as to be able to communicate with each other. A plurality of routers RT may be appropriately arranged in the building BL. The router RT is connected to the linking control device 200 in the general IoT control system 12. As a result, the general device DV is connected to the network service IS. The general device DV is also connected to the general device DV in another general IoT environment 22.

Figure 2:
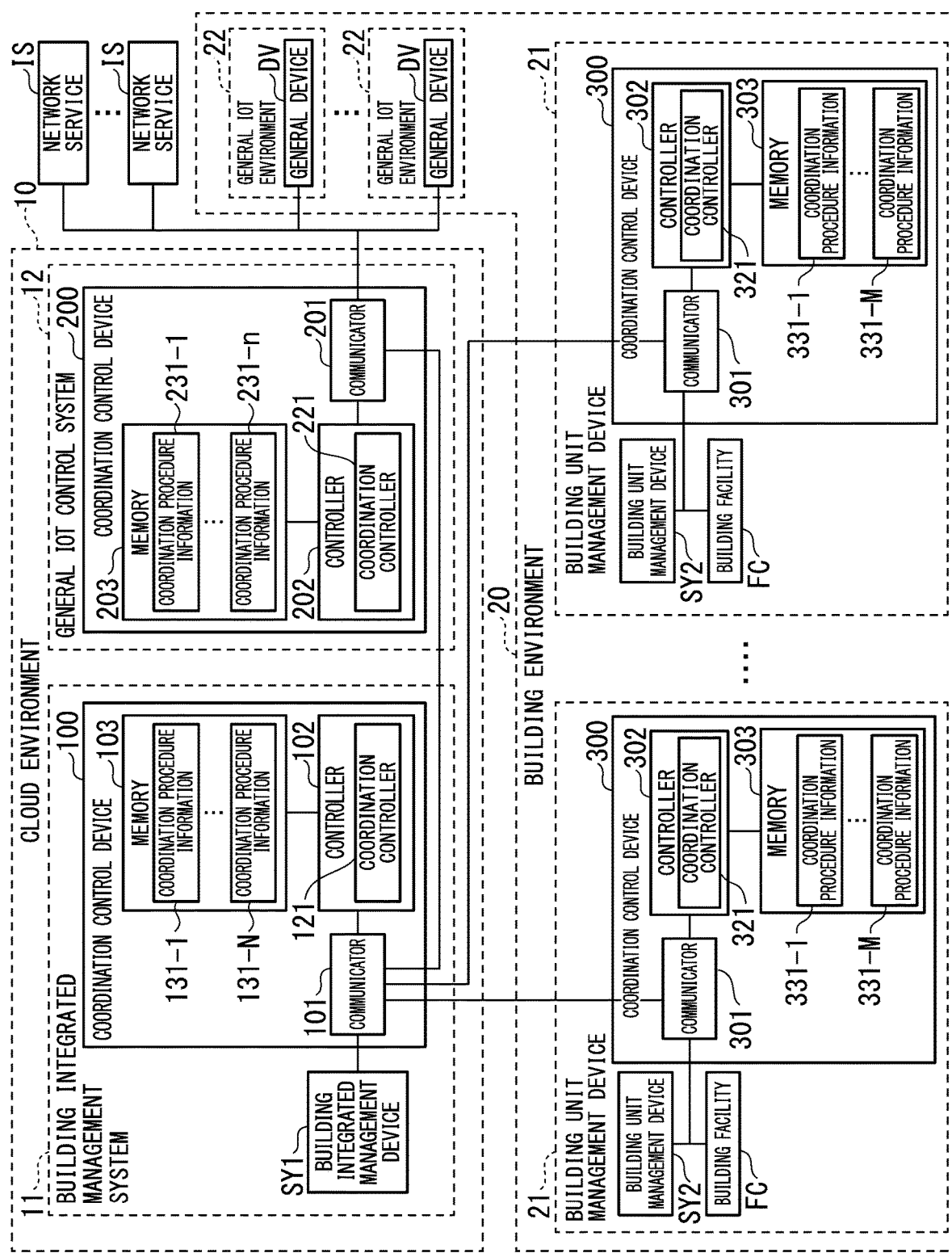
FIG. 2 is a view showing a functional configuration of each linking control system according to the present embodiment.

With reference to FIG. 2, a functional configuration example of the linking control device 100 in the building integrated management system 11, the linking control device 200 in the general IoT control system 12, and the linking control device 300 in the building unit management system 21 will be described. In the following description, the same portions as those shown in FIG. 1 are designated with the same reference sings and the description thereof will be omitted. The functions of the linking control devices 100, 200, 300 as shown in FIG. 2 are realized by executing a program by CPUs (Central Processing Unit) included in the linking control devices 100, 200, 300.

The linking control device 100 in the building integrated management system 11 includes a communication unit 101, a controller 102, and a memory 103.

The communication unit 101 is connected to the building integrated management device SY1 in the same building integrated management system 11 as the building provided with the linking control device 100 so as to be able to communicate with the building integrated management device SY1. The communication unit 101 may be connected to the predetermined network service IS. In the same building integrated management system 11, in a case in which a device other than the building integrated management device SY1 is provided, the communication unit 101 may be connected to the other devices so as to be able to communicate therewith.

The controller 102 executes the control in the linking control device 100. The controller 102 includes a linking controller 121. The linking controller 121 controls such that operations in response to the predetermined application linking function among the plurality of devices connected to the linking control device 100 are executed.

As a specific example of "operations in response to the predetermined application linking function among the plurality of devices", in a case in which states, measurement values, calculation values or the like of one or a plurality of devices satisfy a condition set in advance, an operation of controlling for changing operations and states of another one or plurality of devices by a logic determined in advance is included.

The device connected to the linking control device 100 includes a device (for example, the building integrated management device SY1 or the like) directly connected to the linking control device 100 in the same building integrated management system 11. The devices connected to the linking control device 100 include, for example, a device indirectly connected via the linking control device 200 (for example, general devices DV, the network service IS, and the like). The devices connected to the linking control device 100 include a device (the building unit management device SY2, the building facility FC, and the like) indirectly connected via the linking control device 300 in the building unit management system 21 of a certain building BL.

The memory 103 stores various types of information corresponding to the linking control device 100. As shown in FIG. 2, the memory 103 stores N (N is a natural number equal to or more than 1) of linking procedure information 131 (131-1 to 131-N).

One linking procedure information 131 is information indicating a procedure (rule) for realizing the predetermined application linking.

The linking controller 121 refers to, for example, the linking procedure information corresponding to an application linking request received from an application of a predetermined device. The linking controller 121 executes control such as command output such that the procedure for realizing the requested application linking function is executed based on the referenced linking procedure information.

For example, in a case in which a certain condition based on a request from one or a plurality of devices is satisfied, the linking procedure information 131 may be information including contents to instruct the application of another one or plurality of devices to execute the predetermined procedure according to the IF-THEN statement.

The linking control device 200 in the general IoT control system 12 includes a communication unit 201, a controller 202, and a memory 203.

The communication unit 201 connects to the network service IS and the communication unit 201 is able to communicate with the general devices DV and the like in each of the subordinate general IoT environments 22 via the router RT. In FIG. 2, in order to simplify the figure, an aspect in which the router RT is not shown and the general devices DV and the communication unit 201 are connected to each other is shown.

The controller 202 executes the control in the linking control device 200. The controller 202 includes a linking control unit 221. The linking control unit 221 controls so as to make an operation corresponding to the predetermined application linking to be executed among a plurality of devices connected to the linking control device 200. As a specific example of the "operation corresponding to the predetermined application linking function among a plurality of devices", in a case in which a state, a measurement value, a calculated value, and the like of one or a plurality of devices satisfy predetermined conditions, changing and controlling the operation and state of another one or a plurality of devices according to a predetermined logic is included.

The devices connected to the linking control device 200 are the network service IS, the devices in the general IoT environment 22 (for example, the general device DV and the like), the devices in the building integrated management system 11 (for example, the building integrated management device SY1, and the network service IS (not shown in the figure) and the like), and the devices in the building unit management system 21 (for example, the building unit management device SY2, the building facility FC, the network service IS (not shown in the figure) and the like).

The memory 203 stores various types of information corresponding to the linking control device 200. The memory 203 stores n (n is a natural number equal to or more than 1) numbers of linking procedure information 231 (231-1 to 231-n).

One linking procedure information 131 is information indicating a procedure for realizing the predetermined application linking function. The linking control unit 221 refers to the linking procedure information corresponding to the application linking request received from the application of the predetermined device, for example. The linking control unit 221 executes control such as a command output such that the procedure for realizing the requested application linking function is executed based on the referenced linking procedure information.

The linking control device 300 in the building unit management system 21 includes a communication unit 301, a controller 302, and a memory 303.

The communication unit 301 is communicably connected to the building unit management device SY2 and the building facility FC in the same building unit management system 21 as the building equipped with the linking control device 300. The communication unit 301 may be connected to a predetermined network service IS. In the same building integrated management system 11, when a device other than the building unit management device SY2 and the building facility FC is provided, the communication unit 301 may be connected to such other devices to be able to communicate therewith.

The controller 302 executes the control in the linking control device 300. The controller 302 includes a linking control unit 321. The linking control unit 321 controls so as to make an operation corresponding to the predetermined application linking function to be executed among a plurality of devices connected to the linking control device 300.

Here, as a specific example of the "operation corresponding to the predetermined application linking function among a plurality of devices", in a case in which a state, a measurement value, a calculated value, and the like of one or a plurality of devices satisfy predetermined conditions, changing and controlling the operation and state of another one or a plurality of devices according to a predetermined logic is included.

The devices connected to the linking control device 300 include devices (the building unit management device SY2, the building facility FC and the like) directly connected in the same building unit management system 21. The devices connected to the linking control device 300 include the devices (the building integrated management device SY1) of the building integrated management system 11 and the devices (the building unit management device SY2, the building facility FC and the like) in the building unit management system 21 of other building, which are indirectly connected via the linking control device 100. The devices connected to the linking control device 300 include devices (the network service IS, the general device DV and the like) indirectly connected via the linking control device 100 and the linking control device 200.

The memory 303 stores various types of information corresponding to the linking control device 300. The memory 303 stores M (M is a natural number equal to or more than 1) of linking procedure information 331 (331-1 to 331-M).

One linking procedure information 331 is information indicating a procedure for realizing a predetermined application linking. One linking procedure information includes corresponding command information and procedure instruction information. The corresponding command information is information indicating a command (application linking request (linking command)) for requesting a correspondence application linking. The procedure instruction information is information that instructs a procedure for realizing the corresponding application linking.

The linking control unit 321 refers to the linking procedure information corresponding to the linking command received from the application of the predetermined device, for example. The linking control unit 321 executes control such as a command output such that the procedure for realizing the requested application linking is executed based on the referenced linking procedure information.

The linking system according to the present embodiment having the above-described configuration can perform the application linking as shown below.

First, the linking system causes the application linking between the devices in the building integrated management system 11 and one or more than one devices (for example, the building unit management device SY2, the building facility FC and the like) in one or more than one building unit management system 21 to be performable due to a linking command transmitted from a device in the building integrated management system 11 (for example, the building integrated management device SY1 or the like) as a trigger.

In this case, the linking control device 100 receives the linking command transmitted by the devices in the building integrated management system 11. The linking control device 100 may transmit a procedure instruction command instructing a linking destination device to execute the procedure indicated by the procedure instruction sheet based on the procedure instruction information indicated by the linking procedure information 131 corresponding to the received linking command. At this time, the procedure instruction command is relayed through the linking control device 300 and transferred to the linking destination device. The device as the linking destination that receives the procedure instruction command executes the procedure in response to the procedure instruction command. By such a processing, the application linking is performed between the device in the building integrated management system 11 and the one or more devices in the building unit management system 21.

It is possible for the linking system to perform the application linking with the devices (for example, the building integrated management device SY1 and the like) due to a linking command that is transmitted from the devices (for example, the building unit management device SY2, the building facility FC and the like) in the certain building unit management system 21 as a trigger.

In this case, the linking command transmitted from the device in the building unit management system 21 is transmitted to the linking control device 100 via the linking control device 300. The linking control device 100 transmits a procedure instruction command that instructs to execute the procedure indicated by the procedure instruction information with respect to the device in the building integrated management system 11 as a linking destination based on the procedure instruction information indicated by the linking procedure information 131 corresponding to the received linking command. The device as the linking destination receiving the procedure instruction command executes the processing in response to the procedure instruction command. Due to such a processing, the application linking between the device in the building unit management system 21 and the device in the building integrated management system 11 is performed.

It is possible for the linking system according to the present embodiment to perform the application linking between another device in one or a plurality of general IoT environment 22 and the network service IS due to a linking command transmitted from a device of a general device DV in one certain general IoT environment 22 as a trigger. The one or a plurality of general IoT environment 22 may include the general IoT environment 22 including the device as the transmission source of the linking command.

In this case, for example, the linking command transmitted from the device in the certain general IoT environment 22 is received by the linking control device 200 of the general IoT control system 12. The linking control device 200 transmits a procedure instruction command instructing to execute the procedure indicated by the procedure instruction information with respect to the device (for example, the general device DV in the general IoT environment 22 or the network service IS and the like) as the linking destination based on the procedure instruction information indicated by the linking procedure information 231 corresponding to the received linking command. The device receiving the procedure instruction command as the linking destination executes the processing in response to the procedure instruction command. Due to such a processing, the application linking between the devices in the one or more general IoT environment 22 is performed.

In the linking system according to the present embodiment, the linking control device 100 of the building integrated management system 11 and the linking control device 200 of the general IoT control system 12 are connected. As a result, in the linking system according to the present embodiment, the application linking between the device of the building management system (for example, the building integrated management system 11 and the building unit management system 21) corresponding to the building management and the device of the general IoT environment 22 is possible.

As an aspect of the device application linking between the building management system and the general IoT environment 22, it is possible to perform the application linking between the device of the building integrated management system 11 and one or more specified devices in each of one or more general IoT environment 22 due to the linking command transmitted from the device of the building integrated management system 11 as a trigger.

In this case, the linking control device 100 of the building integrated management system 11 may transmit a procedure instruction command to the device of the general IoT environment 22 as the linking destination based on the linking procedure information 131 corresponding to the received linking command.

Alternatively, the linking control device 100 of the building integrated management system 11 may transmit the linking command transmitted from the device of the building unit management system 21 to the linking control device 200 of the general IoT control system 12. The linking control device 200 may transmit a procedure instruction command to the device of the general IoT environment 22 as the linking destination based on the linking procedure information 231 corresponding to the transmitted linking command.

As an aspect of the device application linking between the building management environment and the general IoT environment 22, another aspect is that it is possible to perform the application linking between the device of the building unit management system 21 and one or more devices in each of one or more general IoT environment 22 due to the linking command transmitted from the device of a certain building unit management system 21 as a trigger.

In this case, the linking control device 100 of the building integrated management system 11 may be configured to transmit the procedure instruction command to the device of the general IoT environment 22 as the linking destination based on the linking procedure information 131 corresponding to the linking command transmitted from the device of the building unit management system 21.

Alternatively, the linking control device 100 of the building integrated management system 11 may transmit the linking command transmitted from the device of the building unit management system 21 to the linking control device 200 of the general IoT control system 12. The linking control device 200 may transmit a procedure instruction command to the device of the general IoT environment 22 as the linking destination based on the linking procedure information 231 corresponding to the transmitted linking command.

As an aspect of the device application linking between the building management system and the general IoT environment 22, a further aspect is that it is possible to perform the application linking between the device in the general IoT environment 22 and the device of the building integrated management system 11 or one or more specified devices in one or more building integrated management system 11 as the linking destination due to the linking command transmitted from the device of one general IoT environment 22 as a trigger.

As an aspect of device application linking between the building management environment and the general IoT environment 22, it is possible to take a linking command transmitted from a device in either of the building integrated management system 11, the building unit management system 21, and the general IoT environment 22 as a trigger to perform the application linking with specified devices in both of the other two systems or environment as the linking destination.

Figure 3:
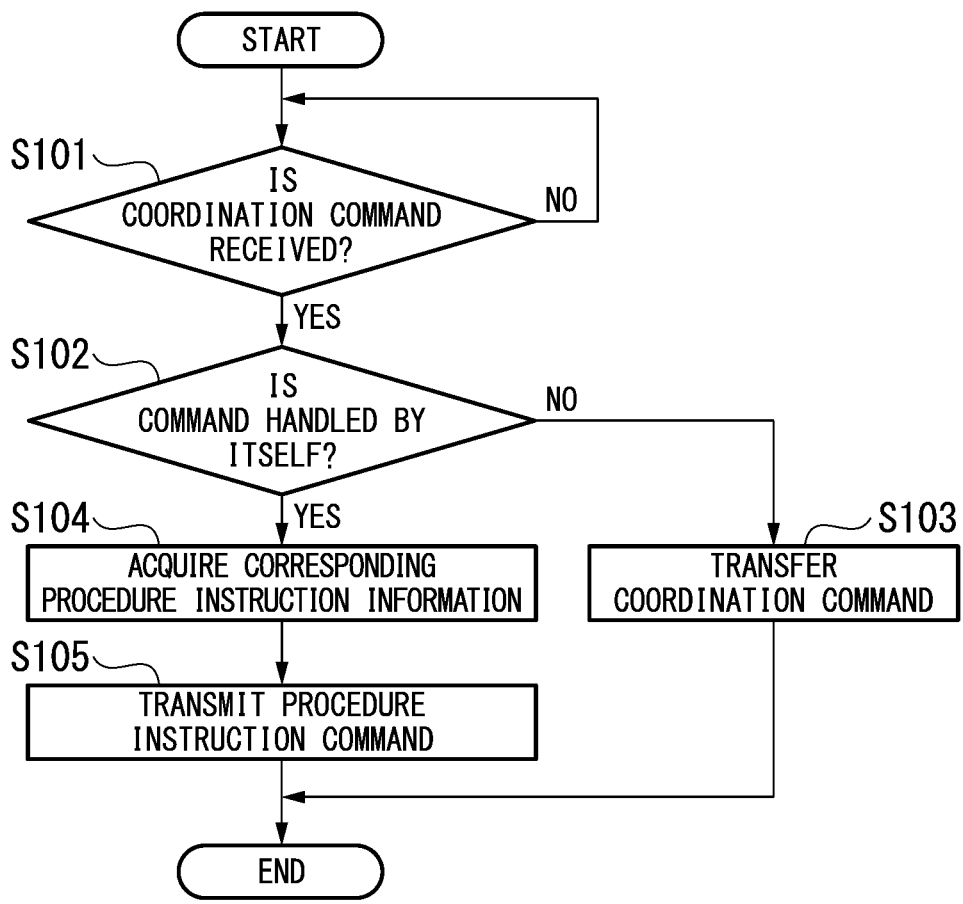
FIG. 3 is a flowchart showing an example of processing procedures relating to an application linking executed by the linking control system according to the present embodiment.

An example of a processing procedure executed by the linking control device (100, 200, 300) relating to the application linking will be described with reference to the flowchart of FIG. 3. In the following description, a case in which the main subject of the processing is the linking control device 100 will be taken as an example.

Step S101: In the linking control device 100, the linking controller 121 is waiting for the linking command to be received.

Step S102: When the linking command is received, the linking controller 121 determines whether or not the received linking command should be handled by itself. For example, the linking controller 121 may perform the determination in Step S102 depending on whether or not specific information (for example, a command identifier) described in the received linking command is included in the linking command that should be processed by itself. Alternatively, the linking controller 121 may execute a process of searching for the linking procedure information 131 associated with the linking command received from the memory 103, and perform the determination in Step S102 depending on whether or not the linking procedure information 131 has been searched. Alternatively, in a case in which the linking controller 121 includes device information indicating the linking control device that should process the corresponding processing in the linking command, the linking controller 121 may perform the determination in Step S102 depending on whether or not the device information indicates itself. Alternatively, the linking controller 121 may perform the determination in Step S102 by comparing an address of the device as the linking destination indicated by the linking command with its own address, for example.

Step S103: In a case in which it is determined in Step S102 that the received linking command should not be handled by itself, the linking controller 121 transmits the received linking command to other linking control devices (200, 300). In this case, the linking controller 121 may transfer the linking command to each of the other linking control devices (200, 300) by the multicast method. Alternatively, the linking controller 121 may specify the linking control device as the transmission destination based on the predetermined information indicated in the received linking command, and transmit the linking command to the specified linking control device.

Step S104: In a case in which it is determined in Step S102 that the received linking command should be handled with by itself, the linking controller 121 acquires the procedure instruction information from the linking procedure information 131 corresponding to the received linking command.

Step S105: The linking controller 121 generates a procedure instruction command based on the procedure instruction information acquired in Step S104, and transmits the generated procedure instruction command to the device as the linking destination.

In the linking system according to the present embodiment, it is possible to easily and flexibly add a new application linking function by storing the linking procedure information corresponding to a certain application linking function in the linking control devices 100, 200, 300.

In order to realize the operation of one application linking, a plurality of linking procedure information may be used between the linking control devices. As an example, for example, while the linking control device 100 is executing the processing according to the predetermined linking procedure information 131 corresponding to the linking command from a predetermined device, the predetermined linking command is transmitted to the linking control device 200. The linking control device 200 executes the processing according to the predetermined linking procedure information 131 corresponding to the received linking command. By such a processing, one operation of the application linking may be obtained.

First Example of Application Linking Adjustment

The linking system according to the present embodiment having the above-described configuration may be configured to execute according to the procedure for realizing the application linking individually corresponding to the linking command (command) according to the corresponding linking procedure information by taking that an application of a certain device issues (transmits) the linking command as a trigger.

However, there are cases where the operations of the application linking corresponding to a plurality of linking commands issued in the linking system have a competing relationship with each other. In this case, it is preferable to adjust the application linking according to each of these linking commands (application linking adjustment). Such application linking adjustment will be described below.

First, a first example of the application linking adjustment will be described.

For example, there is a case in which a plurality of linking commands are issued in a short time with the same device as a control target (linking destination). In such a case, as a result of executing to control the application linking corresponding to each of the issued plurality of linking commands according to the issuing order, there is a case in which the device as the control target may operate unfavorably.

As a specific example, for example, a terminal (for example, a smartphone, a personal computer and the like) as a general device DV of an user A has issued a linking command (linking command A) of a command as "increase the illuminance of the lighting devices in the third area on the second floor of the building" in response to an operation of the user A or according to a predetermined illumination control schedule. After issuing the linking command A, for example, at the timing within a short time such as a few seconds elapses, a terminal as the general device DV of an user B issues a linking command (linking command B) of a command as "increase the illuminance of the lighting devices in the third area on the second floor of the building (or decrease the illumination)".

In such a case, the linking control device that controls the lighting device in the third area on the second floor of the building increases the illuminance of the lighting devices in response to the linking command A according to the issuing order and the issuing timing of the linking command A, and then increases (or decreases) the illuminance of the lighting devices in response to the linking command B. As a result, in a short period of time, the lighting device behaves unnaturally as if the illuminance is continuously changed twice.

Therefore, in the linking system according to the present embodiment, when the linking command for instructing the illuminance change of the lighting devices is issued, the linking control device sets a certain period of time (for example, about 30 seconds) from the time when the linking command is issued as a non-acceptance period of the linking command. The linking control device is configured to not to accept the linking command for instructing the illuminance change of the same lighting device during the non-acceptance period. In this case, the linking control device may perform an error notification to the device that has issued the linking command during the non-acceptance period to notify that the linking command was rejected since it was issued within the non-acceptance period.

In a case in which there are three or more competing application linking in the first example of the application linking adjustment, the linking control device may be configured to execute the application linking of the linking command received first, and not to accept the linking command corresponding to the other 2 or more application linking received during the non-acceptance period.

The linking control device may be configured to execute the application linking of the linking command received first, and temporarily stores (memories) the linking command corresponding to the other two or more competing application linking received during the non-acceptance period to a buffer provided for the command. The linking control device may perform the processing for executing application linking according to all or a part of the commands stored in the buffer after the non-acceptance period ends.

In the first example of such application linking adjustment, among the plurality of linking commands corresponding to the competing application linking, the application linking of the linking command received first by the linking control device is regarded to be executed in priority with respect to the application linking of the competing linking commands received during the non-acceptable period.

FIG. 4A and FIG. 4B show an example of the linking procedure information stored in the linking control device in response to the above-described application linking adjustment. FIG. 4A is an example of the linking procedure information stored in the linking control device corresponding to the linking command A. FIG. 4B is an example of the linking procedure information stored in the linking control device corresponding to the linking command B. The linking procedure information shown by FIG. 4A and FIG. 4B may be stored in, for example, the linking control device 300 in the same building BL as the building provided with the lighting devices as the control target.

First, the linking procedure information includes the corresponding command information, the procedure instruction information, and the adjustment control information. The corresponding command information is information indicating a linking command for requesting correspondence application linking. In the linking procedure information as shown in FIG. 4A, the linking command ID of ID 0001 is stored as the corresponding command information. The linking command ID of ID 0001 indicates the linking command A. In the linking procedure information as shown in FIG. 4B, the linking command ID of ID 0002 is stored as the corresponding command information. The linking command ID of ID0002 indicates the linking command B.

The procedure instruction information is information that instructs the procedure for realizing the corresponding application linking. The procedure instruction information in FIG. 4A and FIG. 4B shows an example of a structure including each information of, for example, an "instruction subject", a "conditional operation", an "execution subject", and an "execution content". Such procedure instruction information includes contents to instruct the operations of the corresponding application linking, for example, in a case in which the "instruction subject" performs the "conditional operation", the "execution subject" executes the "execution content".

Specifically, the procedure instruction information corresponding to the linking command A as shown in FIG. 4A shows the content that in a case in which "a terminal of the user" instructs to "increase the illuminance of the lighting devices in the third area on the second floor of the building", "the lighting devices in the third area on the second floor of the building" executes to "increase the illuminance".

The procedure instruction information corresponding to the linking command B as shown in FIG. 4B shows the content that in a case in which "a terminal of the user" instructs to "decrease the illuminance of the lighting devices in the third area on the second floor of the building", "the lighting devices in the third area on the second floor of the building" executes to "decrease the illuminance".

The adjustment control information indicates the content of the application linking adjustment performed in response to other linking commands when the control of the procedure instruction information is executed in response to the issuance of the corresponding linking command.

The adjustment control information corresponding to the linking command A shown in FIG. 4A shows that a non-acceptance period for the linking command B indicated by the linking command ID of ID0002 in T seconds from the timing when the control corresponding to the linking command A is started should be set.

The adjustment control information corresponding to the linking command B shown in FIG. 4B shows that a non-acceptance period for the linking command A indicated by the linking command ID of ID0001 in T seconds from the timing when the control corresponding to the linking command B is started should be set.

For example, the linking control device 300 increases the illuminance of the lighting devices in the third area on the second floor of the building according to the linking procedure information shown in FIG. 4A in response to receiving the linking command A transmitted from the terminal of the user A. Then, the linking control device 300 sets the non-acceptance period in T seconds from the timing when the execution of the control for increasing the illuminance of the lighting devices in the third area on the second floor of the building is started. As a result, the linking control device 300 can perform control to not to execute the control according to the linking command B even if the linking command B is transmitted during the non-acceptance period.

On the contrary, the linking control device 300 decreases the illuminance of the lighting devices in the third area on the second floor according to the linking procedure information of FIG. 4B in response to receiving the linking command B transmitted from the terminal of the user B. Then, the linking control device 300 sets the unacceptable period in T seconds from the timing when the execution of the control for decreasing the illuminance of the lighting devices in the third area on the second floor is started. As a result, the linking control device 300 can perform control to not to execute the control according to the linking command A even if the linking command A is transmitted during the non-acceptance period.

The adjustment of application linking by setting the non-acceptance period is not limited to the above-mentioned illuminance change of the lighting devices, and may be applied to other application linking.

In addition to performing the control by the linking control device 300 as described above, for example, the linking control devices 100, 200 may control such application linking adjustment.

Second Example of Application Linking Adjustment

As a second example, the linking system of the present embodiment may perform application linking adjustment as follows.

For example, as a general device DV or a building facility FC, a convey robot that conveys supplies is operated in the building BL. The convey robot is configured to be controlled by a robot control system constructed in the building BL. The robot control system is configured such that, for example, the building unit management device SY2, a predetermined building facility FC or the like in the building BL can remotely control the convey robot. The robot control system also includes a function that allows the user to remotely control the convey robot. When the user remotely controls the convey robot, the user operates a terminal as the general device DV to issue the linking command.

The terminal as the general device DV of the user A issues a linking command C with a meaning, for example, "press the upward button of the elevator No. 1" to the convey robot as a control target. At almost the same timing as the issuance of the linking command C, for example, a linking command D with a meaning "press the downward button of the elevator No. 1" is issued from the robot control system. As a result, the linking control device that controls the convey robot stores the linking command C and the linking command D in the buffer.

In such a state, in a case in which the linking control device controls the convey robot according to a sequence stored in the buffer in response to the linking command C and the linking command D, for example, a malfunction occurs that the convey robot executes operations such as when the convey robot presses the upward button of the elevator No. 1, the convey robot then immediately presses the downward button of the elevator No. 2.

For example, with regard to controlling a convey robot, the instructions issued by the robot control system are set to be more important than the instructions given by the user. Therefore, in a case in which a plurality of linking commands C, D corresponding to the user and the robot control system respectively are stored in the buffer as in the above-described example, the linking control device gives a high priority to the linking command D corresponding to the robot control system among the plurality of linking commands C, D.

Specifically, the linking control device may control the convey robot in response to the linking command D among the plurality of linking commands C, D stored in the buffer, and discard the linking command C. Due to such control, the convey robot performs the operation of pressing the downward button of the elevator No. 1 in response to the linking command D, but does not perform the operation of pressing the upward button of the elevator No. 1 in response to the linking command C.

Alternatively, the linking control device may control the convey robot in response to the linking command D having a relatively high priority among the plurality of linking commands C, D stored in the buffer. Next, the linking control device may control the convey robot in response to the linking command C after a certain period of time has elapsed from the control of the convey robot corresponding to the linking command D, or at the timing when the operation of the elevator No. 1 corresponding to the operation of the convey robot corresponding to the linking command D is completed. In this case, the convey robot first performs the operation of pressing the downward button of the elevator No. 1 in response to the linking command D, and then performs the operation of pressing the upward button of the elevator No. 1 in response to the linking command C.

FIG. 5A and FIG. 5B show an example of the linking procedure information stored in the linking control device in response to the above-described application linking adjustment. FIG. 5A is an example of the linking procedure information stored in the linking control device corresponding to the linking command C. FIG. 5B is an example of the linking procedure information stored in the linking control device corresponding to the linking command D. The linking procedure information shown in FIG. 5A and FIG. 5B may be stored in, for example, the linking control device 300 in the same building BL as the building provided with the lighting devices as the control targets.

The linking procedure information shown in FIG. 5A and FIG. 5B includes corresponding command information, procedure instruction information, priority setting information, and priority control information.

ID0011 stored as the corresponding command information in FIG. 5A indicates the linking command C. The procedure instruction information of FIG. 5A shows that if the "terminal of the user" has given the "button operation instruction of the elevator No. 1 (in this case, the upward button operation is specified)", the "convey robot" "operates the button in the specified direction (in this case, upward) of the elevator No. 1".

ID0012 stored as the corresponding command information in FIG. 5B indicates the linking command D. The procedure instruction information of FIG. 5B shows that if the "robot control system" has issued the "button operation instruction of the elevator No. 1 (in this case, the downward button operation is specified)", the "convey robot" "operates the button in the specified direction (in this case, downward) of the elevator No. 1".

The priority setting information indicates the content related to the priority setting for the application linking by executing the corresponding procedure instruction information.

The priority control information indicates the control which should be executed according to the operation set to be in priority with regard to the corresponding application linking.

The priority setting information in the linking procedure information of FIG. 5A corresponding to the linking command C indicates that the priority of the corresponding application linking is set to be lower with respect to the application linking corresponding to the linking command D of ID0012.

The priority setting information in the linking procedure information of FIG. 5B corresponding to the linking command D indicates that the priority of the corresponding application linking is set to be higher with respect to the application linking corresponding to the linking command C of ID0011. Then, the priority control information in the linking procedure information of FIG. 5B shows that in a case in which the linking command C of ID0011 is stored in the buffer of the linking control device 300 together with the linking command D of the corresponding ID0012, the linking command C of ID0011 should be discarded.

As a result of describing the linking procedure information corresponding to the plurality of linking commands C, D as in FIG. 5A and FIG. 5B, when the plurality of linking commands C, D are stored in the buffer of the linking control device 300, the linking control device 300 can perform the control so as to execute the operation of application linking corresponding to the linking command D and not to execute the operation of application linking corresponding to the linking command C.

That is, it is possible for the convey robot to control so as to perform the button operation of the elevator No. 1 in response to the linking command C from the robot control system, and not to perform the button operation of the elevator No. 1 in response to the linking command D from the terminal of the user.

The adjustment of the application linking by setting the priority in the linking command in this manner is not limited to the control of the convey robot as described above, and may be applied to other application linking.

The method of describing the priority of the priority setting information may be expressed by a character description as shown in FIG. 5A and FIG. 5B, or may be expressed by the magnitude of the numerical value (for example, the expression by 100, 50, 10, 1, 0, −10 or the like), or may be described by the alphabet letters such as A, B, C, or may be described by symbols or the like.

With regard to such application linking adjustment, in addition to the control by the linking control device 300 as described above, for example, the linking control devices 100, 200 may perform the control.

[Application Linking Procedure (Rule) Division]

When realizing the application linking according to one linking procedure information, depending on the content of the procedure (rule) indicated by the procedure instruction information stored in the linking procedure information, there is a case in which it is preferable to divide the procedure instruction information into a plurality of procedure instruction information and then execute the procedure rather than executing according to the one procedure instruction information in terms of effectiveness (feasibility), control efficiency, ease of facility mounting, and the like.

As an example, a human detection system is introduced in a certain building BL. The human detection system may be, for example, configured to include beacons (or surveillance cameras or the like) as a type of building facilities FC provided in various locations in the building BL and the building unit management device SY2 that executes the processing related to the human detection based on signals transmitted from the beacons.

Here, as an application linking corresponding to the human detection system, a case of performing a security operation that "when a person is detected in the third area on the second floor of the building, a notification of an invasion of a suspicious person by voice of a security AI speaker (or a speaker used by a security guard for monitoring, for example) is performed" will be described as an example. With regard to perform such security operation, for example, in order to ensure the security, it is preferable to issue an alarm in the third area on the second floor of the building at first according to the result of human detection in the third area on the second floor of the building.

Taking such circumstances into consideration, the procedure corresponding to the application linking as the above-described security operation may be controlled to be executed by dividing the procedure into a first procedure including the content of "in a case in which a person is detected in the third area on the second floor of the building, an alarm of a suspicious person invasion is issued by an entrance-exit system in the third area on the second floor" and a second procedure including the content of "in a case in which an alarm of a suspicious person invasion is issued by an entrance-exit system in the third area on the second floor, a notification of a suspicious person confirmation is performed by voice of a security AI speaker".

FIG. 6A, FIG. 6B, and FIG. 6C show an example of linking procedure information stored in the linking control device 300 corresponding to the procedure division of the application linking as described above.

In a case of corresponding to the procedure division of the application linking described above, the linking control device 300 is configured to store the main linking procedure information shown in FIG. 6A and the sub linking procedure information shown in FIG. 6B and FIG. 6C.

In the main linking procedure information shown in FIG. 6A, the linking command ID of ID 0021 is stored as the corresponding command information. The main linking procedure information and the procedure instruction information as shown in FIG. 6 show an overall flow of the application linking such as in a case in which the "human detection system" "detects a person in the third area on the second floor", the "AI speaker with the device ID=XXX" "performs the notification of invasion of the suspicious person by voice".

Furthermore, the main linking procedure information shown in FIG. 6A includes an area of the related sub command ID. The area of the related sub command ID stores the linking command ID associated with the sub linking procedure information corresponding to the main linking procedure information as shown in FIG. 6A. In FIG. 6A, ID0022 and ID0023 are stored as the linking command ID.

In the sub linking procedure information shown in FIG. 6B, ID0022 is stored as the corresponding command information, and in the sub linking procedure information shown in FIG. 6C, ID0023 is stored as the corresponding command information. By such processing, the main linking procedure information and the sub linking procedure information are associated with each other due to the linking command ID stored in the related sub command ID of the main linking procedure information and the linking command ID stored in the corresponding command information of the sub linking procedure information can be used as.

According to the procedure instruction information of the sub linking procedure information shown in FIG. 6B, the operations of the application linking with the contents that if the "human detection system" "detects a person in the third area on the second floor", the "entrance-exit facility in the third area on the second floor" performs "the notification of invasion of the suspicious person" are shown.

Due to the procedure instruction information of the sub linking procedure information shown in FIG. 6C, if the "entrance-exit facility in the third area on the second floor" has performed the "notification of invasion of the suspicious person", the operations of the application linking with the contents that the "AI speaker with device ID=XXX" performs "the notification of invasion of the suspicious person by voice" are shown.

When the linking control device 300 receives the linking command having the linking command ID of ID 0021, the linking control device 300 first accesses the linking procedure information of FIG. 6A, which stores ID 0021 as the corresponding command information. In this case, the linking control device 300 recognizes that ID 0022 and ID 0023 are stored as the sub command IDs related to the linking procedure information of FIG. 6A. The linking control device 300 accesses the linking procedure information of FIG. 6B and FIG. 6C, which stores the linking command IDs of ID 0022 and ID 0023 as the corresponding command information.

In this case, the linking control device 300 accesses the linking procedure information of FIG. 6B in which the instruction subject and the conditional operations in the procedure instruction information of the linking procedure information are the same with that of FIG. 6A at first. The linking control device 300 controls such that the notification of the invasion of the suspicious person is executed by the entrance-exit facility in the third area on the second floor of the building according to the procedure instruction information in the linking procedure information of FIG. 6B. By the control according to the procedure instruction information in the linking procedure information of FIG. 6B, the corresponding instruction subject performs the operations indicated by the conditional operation according to the procedure instruction information of the linking procedure information of FIG. 6C. In response to the operations, the linking control device 300 executes the control corresponding to the execution subject and the execution contents of the procedure instruction information in the linking procedure information of FIG. 6C.

By such control, in response to that the human detection system detects a person in the third area on the second floor of the building, the operations of the application linking in which the notification of the invasion of the suspicious person is performed by the entrance-exit facility in the third area on the second floor of the building, and further the notification of invasion of the suspicious person is performed by an AI speaker for security by voice are performed.

In the above example, by executing the operations of the application linking according to the procedure instruction information of the sub linking procedure information shown in FIG. 6B and FIG. 6C, as a result, the operations of the application linking according to the main linking procedure information shown in FIG. 6A can be obtained. In a case in which the operations of the application linking are executed according to the procedure instruction information of the sub linking procedure information shown in FIG. 6B and FIG. 6C, the notification of the invasion of the suspicious person by the entrance-exit facility in the third area on the second floor is added. In this case, the linking control device 300 may determine whether or not to execute the control according to the related sub command ID, for example, based on the predetermined settings, the situation determination, and the like. That is, the linking control device 300 may be switchable between the control of the application linking according to the procedure instruction information of FIG. 6A and the control of the application linking according to the two procedure instruction information of FIG. 6B and FIG. 6C as the control according to the main linking procedure information shown in FIG. 6A. Accordingly, for example, it is possible to provide variations to the operations of one main application linking according to the operations in the building BL and various situations, and increase the degree of freedom of the application linking.

[Regarding Uniformalization of Map Processing]

For example, in one building BL, it is possible to construct a positional information processing system that acquires positional information indicating the positions of a person and an object and uses the acquired positional information for a predetermined purpose to perform the application linking. In this case, a plurality of positional information processing systems may be provided in the same building BL, and the plurality of positional information processing systems may acquire the positional information by different methods, and the uses of the positional information may be different.

In each of the plurality of positional information processing systems, as information output regarding the acquired positional information, for example, it is required to plot and show the links indicated by the acquired positional information on a map (a plan view of each floor and the like) for the building BL.

In this case, the map information corresponding to the plurality of positional information processing systems is the information in connection with the same building BL. Taking such circumstances into consideration, regarding the map processing that reflects the links of the positional information on the map of the building BL, it is preferable that the processing is uniformized rather than that each of the plurality of positional information processing systems prepares the map information individually and executes the map processing. That is, it is preferable that the map processing is centrally performed by using the common map information with respect to each of the plurality of positional information processing systems.

Therefore, a configuration in which the map processing is uniformized in a building BL provided with a plurality of positional information processing systems will be described below.

Figure 7:
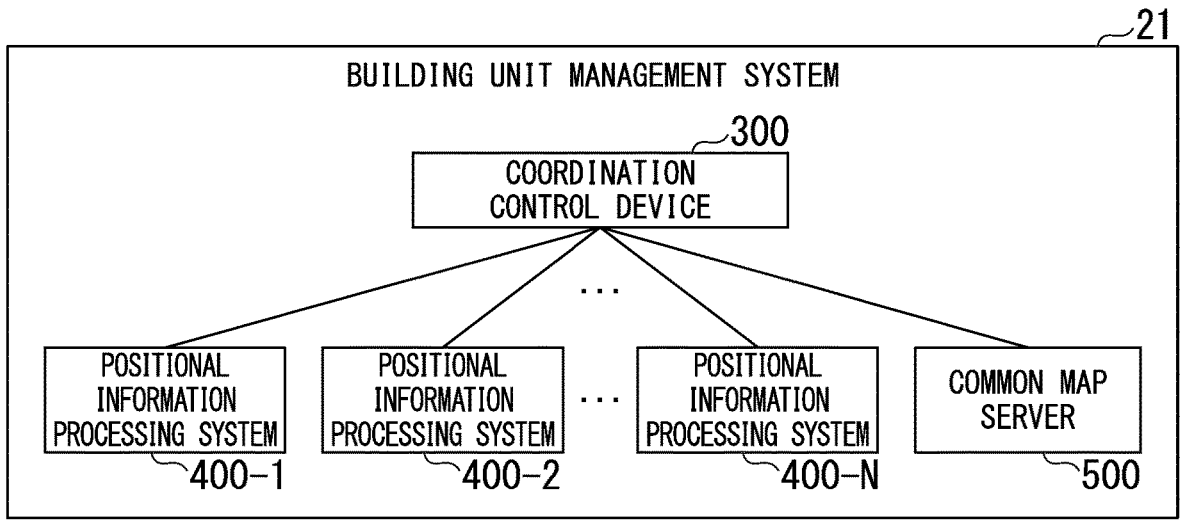
FIG. 7 is a view showing a configuration example of a building unit management system corresponding to an uniformalization of map processing according to the present embodiment.

FIG. 7 shows a configuration example of the building unit management system 21 corresponding to the uniformalization of map processing in one building BL. The building unit management system 21 shown in FIG. 7 has a configuration in which a plurality of positional information processing systems 400 (400-1 to 400-N) and a common map server 500 are connected to the linking control device 300.

The positional information processing system 400 may be configured to include at least either of the building facility FC provided in the building BL and the general device DV. The common map server 500 is provided as one of the building facilities FC. The common map server 500 may be provided as a general device.

The positional information processing systems 400 are a plurality of systems that each realizes an application that acquires positional information by a predetermined method and uses the acquired positional information for a predetermined purpose. Each of the plurality of positional information processing systems 400 has a different application depending on the positional information acquisition method, the use of the positional information, and the like.

A certain positional information processing system 400 can acquire the user's positional information based on the communication between the beacon compatible communication device possessed by the user and the beacons provided in various places of the building BL, for example. A certain positional information processing system 400 can acquire the user's positional information by receiving the positional information transmitted from the terminal such as a smartphone and the like possessed by the user.

A certain positional information processing system 400 provides wireless LAN access points in various places in the building BL, and acquires the user's positional information based on the position of the wireless LAN access point to which the user's terminal (for example, a smartphone or the like) is connected.

A certain positional information processing system 400 can acquire the user's positional information by providing cameras at various places in the building BL and analyzing the captured images obtained by the cameras.

A certain positional information processing system 400 provides tag readers corresponding to RFID (Radio Frequency Identifier) tags in various places in the building BL, and acquires the user's positional information based on the position of the tag reader to which the RFID tag possessed by the user is connected.

The positional information processing system 400 may be adapted to acquire positional information not only for a person but also for an object in the building BL by each of the above-mentioned methods for acquiring the positional information.

The plurality of positional information processing systems 400 may be systems corresponding to different uses, for example. For example, a certain positional information processing system 400 may be a system that acquires the positional information of a person in the building BL for security against an illegal intruder.

A certain positional information processing system 400 may be a system that acquires the positional information of a person in the building BL in order to provide a predetermined service to the user staying in the building BL.

A certain positional information processing system 400 may be adapted to acquire positional information of a predetermined target object in the building BL in order to manage a moving body operating in the building BL. The moving body may be, for example, one configuration that moves as a person carries it, or may be a system that moves autonomously, such as a robot.

The positional information acquisition method, the usage of the positional information, the purpose of using the positional information, the application, and the like to which one positional information processing system 400 corresponds are not limited to the above-described examples, and may be other aspects.

In a case in which the positional information processing system 400 needs the map information (position assignment map information) of the building BL in which the links indicated by the positional information are plotted, each positional information processing system 400 (400-1 to 400-N) does not have a map processing function individually, but sends a map processing request to the linking control device 300 as a linking command. The map processing request includes, for example, the positional information currently acquired by the positional information processing system 400.

The common map server 500 executes the map processing in response to the map processing request transmitted from the positional information processing system 400. That is, the common map server 500 generates the position assignment map information in which the links indicated by the positional information included in the received map processing request are plotted on the map.

The common map server 500 can generate the position assignment map information in which only the links of the positional information acquired by one positional information processing system 400 are plotted. The common map server 500 can also generate the position assignment map information plotted by integrating the links of positional information acquired by two or more predetermined positional information processing systems 400 designated in advance according to, for example, an application or the like.

The determination by the common map sever 500 that the positional information acquired by which positional information processing system 400 should be plotted in one position assignment map information may be processed, for example, according to the instruction content of the map processing request transmitted from one positional information processing system 400, the preset setting of the linking relationship between one positional information processing system and another positional information processing system 400. Therefore, the position assignment map information generated by the common map server 500 may be the information in which the positional information corresponding to only one positional information processing system 400 is plotted, or the information in which the positional information corresponding to a plurality of predetermined positional information processing systems 400 is plotted.

The common map server 500 can output the generated position assignment map information as follows. For example, the common map server 500 may transmit the position assignment map information to the corresponding positional information processing system 400, and make the position assignment map information to be displayed on a display device (for example, a monitor, a signage, a digital signage, or the like) connected to the positional information processing system 400. The position assignment map information displayed on the display device may be, for example, an aspect in which marks, icons, and the like corresponding to the positional information are arranged on a plan view or in a three-dimensional space.

The common map server 500 may display the predetermined position assignment map information on a display device connected to itself. The common map server 500 may make the predetermined position assignment map information to be displayed on the predetermined linking control device 300 or the display device under the control of the linking control device 300.

The common map server 500 can also provide the generated position assignment map information to the building unit management system 21 in another building BL via, for example, the linking control device 300.

In the positional information processing system 400, for example, every time the positional information is newly acquired, or after every fixed period, or every time when a number of newly acquired position information or a number of non-acquirable position information satisfies a predetermined condition, or every time when the number of newly acquired position information reaches a predetermined value, the map processing request may be transmitted. The common map server 500 generates corresponding position assignment map information each time when the map processing request is received, and outputs and transmits the position assignment map information so as to be displayed on the predetermined display device as described above for example. In this case, the positional information processing system 400 can display the position assignment map information by sequentially updating the position assignment map information.

As an example of the aspect of the position assignment map information displayed by the display device connected to the positional information processing system 400, in a case in which it is based on the position assignment map information shown in FIG. 9A described later, the building BL shown in FIG. 9A may be made such that a map in three dimensions, a vertical surface, a planar surface, or the like can be appropriately displayed. A specific area or the like, which will be described later, set in the building BL may be displayed so as to be reflected on each of the above-described maps.

Figure 8:
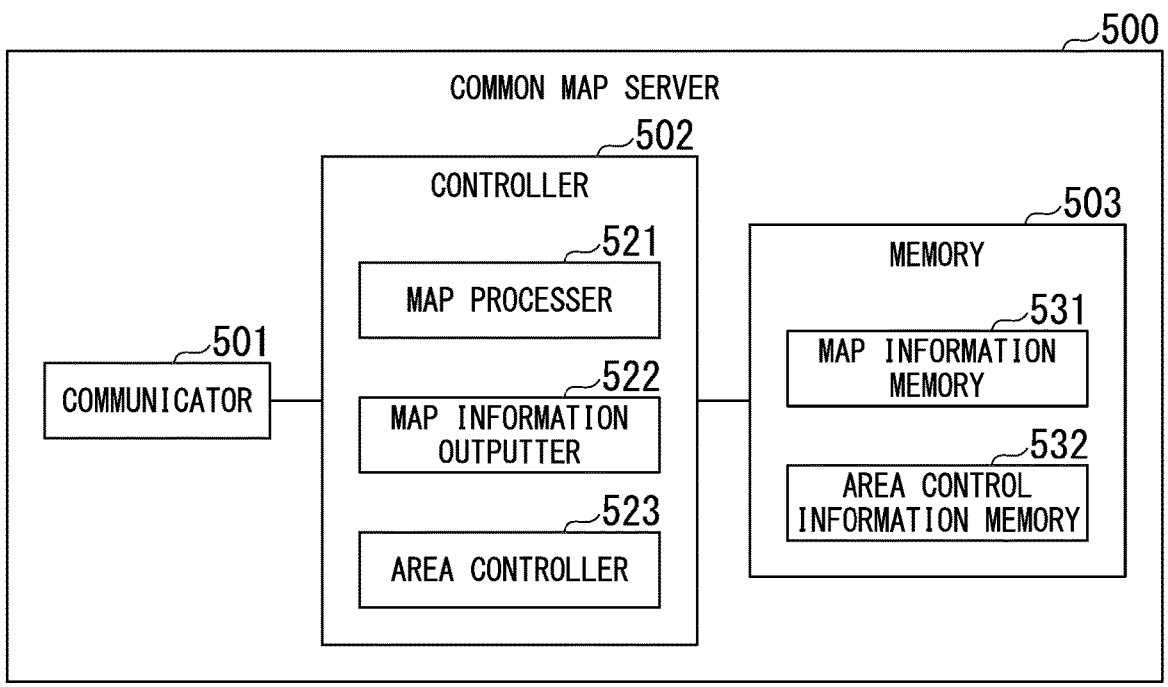
FIG. 8 is a view showing a configuration example of a common map sever according to the present embodiment.

FIG. 8 shows a configuration example of the common map server 500. The common map server 500 in FIG. 8 includes a communication unit 501, a controller 502, and a memory 503.

The communication unit 501 communicates with the linking control device 300, the positional information processing system 400, and the like via the network. The communication unit 501 may be capable of communicating with the building facility FC, the building unit management device SY2, and the like other than the positional information processing system 400 in the building BL.

The controller 502 executes various control on the common map server 500. The functions as the controller 502 are realized by the CPU provided in the common map server 500 executing the programs. The controller 502 includes a map processor 521, a map information outputter 522, and an area controller 523.

The map processor 521 executes the map processing in response to the map processing request transmitted from the positional information processing system 400. That is, the map processor 521 plots the links of the positional information included in the map processing request on the map of the building BL shown by the map information stored in the map information memory 531 of the memory 503. The map of the building BL shown by the map information has, for example, a two-dimensional or a three-dimensional space corresponding to each floor of the building BL.

The map information outputter 522 transmits the position assignment map information generated by the map processing of the map processor 521 to the positional information processing system 400 of the transmission source of the map processing request.

The area controller 523 can execute the application linking related to the map processing by issuing a linking command based on the area control information stored in the area control information memory 532. The area related to the control of the area controller 523 will be described later.

The memory 503 stores various information related to the common map server 500. The memory 503 includes a map information memory 531 and an area control information memory 532.

The map information memory 531 stores the map information of the building BL. The map information of the building BL may be two-dimensional data such as a plan view of the building BL, or may be three-dimensional data representing the structure of the building BL in three dimensions.

As the map information of the two-dimensional data, in a case in which the building BL has a structure having a plurality of floors, the two-dimensional data of each floor is prepared. At the time of display, the two-dimensional data of each floor may be arranged on the same image, or may include information that can be switched by page feed for each floor.

The map information as the two-dimensional data may be information in which links are associated with image data in a predetermined format such as the JPEG format. Alternatively, the map information as the two-dimensional data may be information generated based on the two-dimensional CAD data or the like. Alternatively, the map information as the two-dimensional data may be data obtained by converting a model generated by the BIM (Building Information Modeling) into two dimensions.

The map information as three-dimensional data may be, for example, information created based on a predetermined three-dimensional model. The three-dimensional model may be, for example, a model created by three-dimensional CAD or a model created by BIM.

Regarding the map information, for example, it is possible to reduce the processing load of the map processing in the common map server 500 and the processing load of displaying the position assignment map information on the display device (monitor, signage, digital signage, and the like) connected to the positional information processing system 400, the common map server 500, the linking control device and the like by using the image data in the predetermined format in a case of the two-dimensional data and using the three-dimensional model generated by a simple modeling method in a case of the three-dimensional data.

The area control information memory 532 stores the area control information. The area control information is information that controls such that a predetermined application linking is executed when a predetermined condition is satisfied for a predetermined area (specific area) defined in the map.

Figures 9A, 9B:
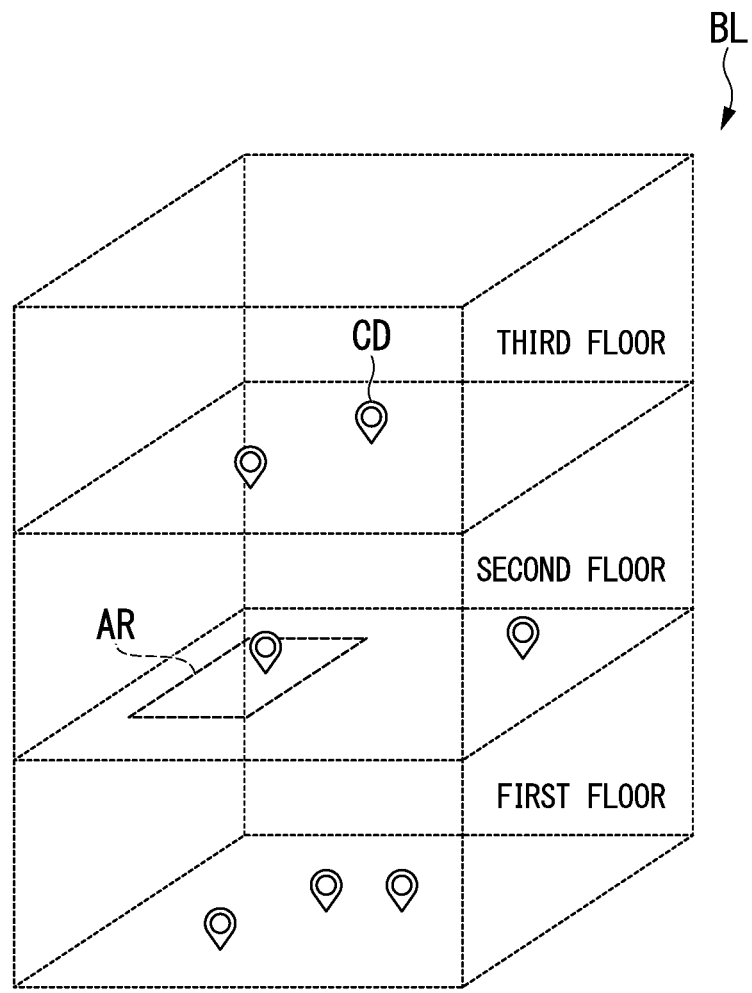
FIG. 9A is a view showing an example of position assignment map information in which a specific area is set according to the present embodiment.
FIG. 9B is a view showing an example of position assignment map information in which a specific area is set according to the present embodiment.

As an example of utilizing the specific area, here, as shown in FIG. 9A, a specific part of the second floor of the building BL is defined as the specific area AR. An example of performing control such as turning on the lighting devices of the specific area AR when a person enters the specific area AR can is considerable. The area control information will be described with reference to such an example.

In such an example, due to the area control information, an application linking that "when a person's link CD is plotted with respect to the specific area AR based on the positional information transmitted from the positional information processing system 400-1, the lighting devices installed in the specific area are turned on" can be executed.

As shown in FIG. 9B, the area control information corresponding to the execution of one application linking may be configured to include, for example, area designation information and linking commands.

The area designation information is information in the map information that indicates a range where the specific area is. In the correspondence of the above example, the link range of the specific area AR on the second floor of the building BL shown in FIG. 9A is shown.

By designating a specific area due to the area designation information in this manner, as a conditional operation of the linking procedure information described in FIG. 4A to FIG. 6C, a description that "a person's links CD is plotted with respect to the specific area AR (a person enters the specific area)" becomes possible.

The linking command may be utilized as a command for designating the linking procedure information that uses the information of the specific area in a description of conditional operation. The linking command may be, for example, a command indicating a linking command ID corresponding to the corresponding linking procedure information. Instead of the linking command, information specifying the corresponding linking procedure information may be included in the area control information.

When the map processing is executed, the area controller 523 of the common map server 500 determines whether or not there is information that satisfies the condition indicated by condition information among the area control information stored in the area control information memory 532. In a case there is area control information that satisfies the condition, the area controller 523 transmits the linking command included in the area control information to the linking control device 300. The linking controller 321 of the linking control device 300 refers to the linking procedure information corresponding to the received linking command, and controls such that the procedure indicated in the referred linking procedure information is executed. In the case of the above-described example, the linking controller 321 controls the lighting devices installed in the specific area A as the building facilities FC to light up.

The area control information may include information with contents to issue a linking command such that a predetermined application linking is performed corresponding to a change such as that links of a person who is plotted in the specific area of the map transition into a state of being not plotted in the specific area due to a movement of the plotted person, for example.

The configuration of FIG. 7 is shown as an example in which the positional information processing system 400 and the common map server 500 are combined with the linking control device 300 in the building unit management system 21; however, the configuration is not limited thereto. For example, in the building integrated management system 11, the linking control device 100, the positional information processing system 400, and the common map server 500 may be a combined configuration. In the general IoT control system 12, the linking control device 200, the positional information processing system 400, and the common map server 500 may be a combined configuration.

In FIG. 8, an example in which the positional information processing system 400 and the common map server 500 are provided in the building unit management system 21 corresponding to one building BL is shown. In this case, the map processing by the common map server 500 is completed in one building BL.

However, the map processing according to the present embodiment may be a processing corresponding to a plurality of buildings BL.

For example, in the map processing, the links of the positional information acquired by the predetermined (one or multiple) positional information processing system 400 for each plurality of buildings BL may be integrated into one map information and plotted to generate the position assignment map information. In this case, the position assignment map information may be generated so as to be executed by the linking control device 100 in the building integrated management system 11, for example.

In the map processing, the links of the positional information acquired by the (one or multiple) positional information processing system 400 provided in each building BL, street, and the like on the map of the city including the plurality of buildings BL may be used to generate the position assignment map information plotted in the map information. Also in this case, the generation of the position assignment map information may be executed by, for example, the linking control device 100 in the building integrated management system 11.

In the linking system according to the present embodiment, among the linking control devices 100, 200, 300, as the linking control device that executes the control for the application linking by the devices between the building management system and the general IoT environment 22, the linking control device 100 only may be used. In this case, the linking control device 300 may be set to perform the control limited to the application linking in the building unit management system 21 including the linking control device 300 itself. Alternatively, in this case, the linking control device 300 may not be provided. In this case, the linking control device 200 may be limited to a function of managing the connections of the general device DV, the network service IS, and the like.

A program for realizing the functions of the above-mentioned linking control devices 100, 200, 300 and the like is recorded in a computer-readable recording medium, and the program recorded in the recording medium is read into a computer system and executed therein so as to perform the above-mentioned processing as the linking control devices 100, 200, 300 and the like. Here, the feature "the program recorded in the recording medium is read into a computer system and executed therein" includes installing the program in the computer system. Here, the term "computer system" is a configuration including an OS and hardware including peripheral devices and the like. The "computer system" may include a plurality of computer devices connected via a network including a communication line. The recording medium includes an internal or external recording medium that is accessible from the distribution server for distributing the program.

Although the embodiment of the present invention has been described in detail with reference to the figures, the specific configuration is not limited to this embodiment, and includes designs and the like within a range that does not deviate from the scope of the present disclosure.

What is claimed is:

1. A linking system, comprising:
   a first linking control device comprising a processor which performs control such that a first building management system that manages building facilities provided in a first building and a first device connected to an internet are linked to realize a specific function; and
   a memory, wherein
   the first linking control device performs operations comprising:
      storing, in the memory linking procedure information indicating procedures for realizing the linking of the specific function; and
      operation as a linking controller which controls (i) an output to the first device in response to an input from the first building management system or (ii) an output to the first building management system in response to an input from the first device so as to realize the specific function based on the linking procedure information stored in the memory,
   the linking procedure information includes corresponding command information indicating a command for requesting correspondence linking, and procedure instruction information indicating an instruction subject, a conditional operation, an execution subject, and an execution content,
   operation as the linking controller causes a device designated as the execution subject to execute a process specified as the execution content when a device designated as the instruction subject satisfies the conditional operation,
   the first building management system has a plurality of positional information processing systems that acquire positional information of objects in the first building, and a common map server that generates position assignment map information in which the positional information acquired by two or more predetermined positional information processing systems are plotted on a map, and
   the determination by the common map server that the positional information acquired by which positional information processing system should be plotted in the position assignment map information is processed based on information regarding a map processing request by one positional information processing system.

2. The linking system according to claim 1, wherein the first linking control device is included in a building integrated management system which integrally manages the facilities in a plurality of buildings.

3. The linking system according to claim 2,
   wherein the building integrated management system includes a second linking control device in addition to the first linking control device, the second linking control device performing control so as to realize a specific function between a second building management system that manages building facilities provided in a second building and a second device, and the first linking control device individually performs control to realize the specific function between the first building management system and the first device when the first device is a device provided in the first building.

4. The linking system according to claim 2, wherein the first device is a building facility or a device provided in the second building.

* * * * *